UNITED STATES PATENT OFFICE.

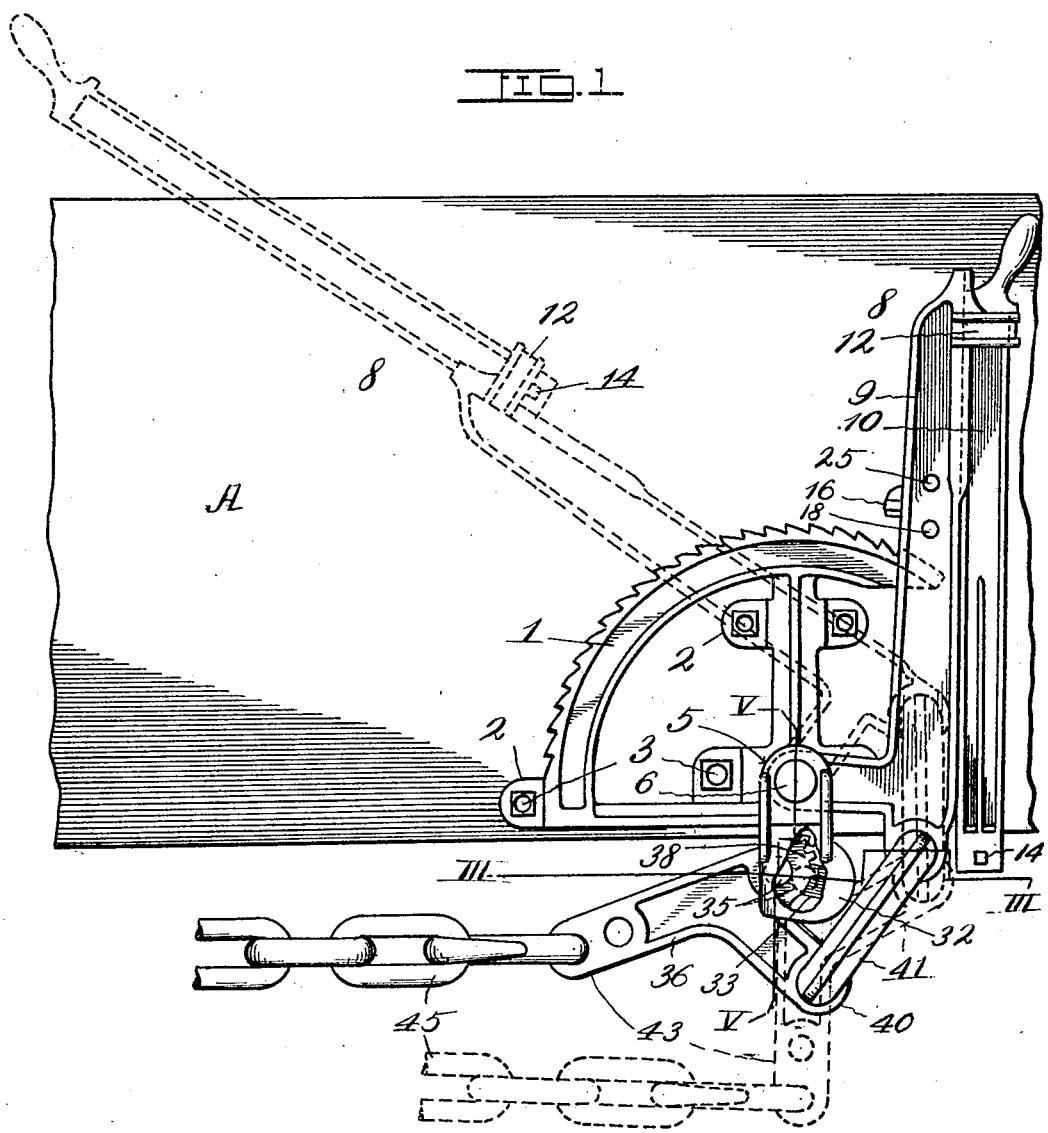

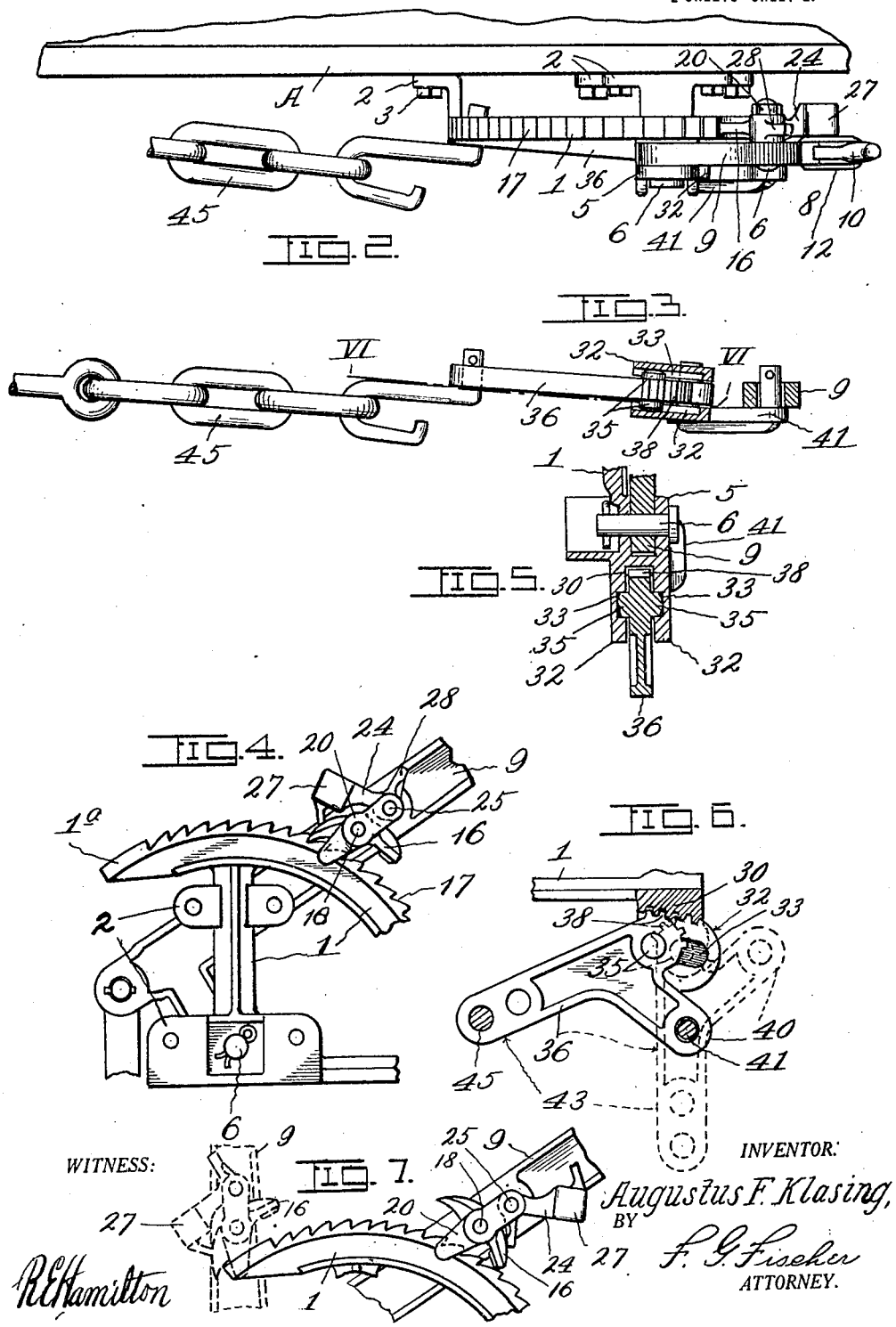

AUGUSTUS F. KLASING, OF DENVER, COLORADO, ASSIGNOR TO THE KLASING CAR BRAKE COMPANY, A CORPORATION OF COLORADO.

CAR BRAKE.

1,420,552.     Specification of Letters Patent.    Patented June 20, 1922.

Application filed March 5, 1918. Serial No. 220,467.

*To all whom it may concern:*

Be it known that I, AUGUSTUS F. KLASING, a citizen of the United States, residing at Denver, in the county of Denver and State of Colorado, have invented certain new and useful Improvements in Car Brakes, of which the following is a specification.

My invention relates to an apparatus for operating the brakes of a railway car, and more especially to an apparatus whereby the brakes may be set or released by hand in switching the car, or on other occasions when manual control of the brake mechanism is required. A freight car is usually provided with a manually operated brake-setting apparatus, in addition to the compressed air operated brake setting mechanism. The manually operated means consists ordinarily of a brake staff on the lower end of which is wound a chain connected with the under side of the car, the upper end of the staff being provided with a hand wheel and the brakes being held in the set position by means of a ratchet and detent device which the brakeman operates with his foot when the brakes are released. This common type of apparatus is uncertain in its functioning, slow of operation and requires very considerable effort in setting the brakes, the brakeman frequently using a club on the wheel to obtain increased leverage. Besides this, this type of apparatus necessitates great care when the brakes are released since the reaction of the hand wheel is very quick and violent. Moreover, it sometimes happens that the chain kinks or does not wind truly on the brake staff so that there is an apparent take-up of slack in the connections without the brakes being reliably set. As a consequence of these defects in the type of manually operated brake setting device now in common use, accidents in switching and in making up trains, especially in hump yards, are not infrequent, resulting often in loss of life or injury to the trainmen and damage to the cars and cargoes through impact of one car with another.

Other mechanisms for the manual operation of car brakes have been devised and used to a certain limited extent, but for one reason or another, for example, because of their complexity, cumbersome construction and uncertainty of operation these devices have not been generally adopted by railroads.

The principal object of my invention is to provide a new and improved apparatus for the manual control of the brakes of a railway car which will be relatively simple in construction, compact, positive and certain in its action, and which may be operated without great exertion on the part of the trainman and without danger, to quickly take up the slack in the brake connections and apply the brake shoes to the wheels with the necessary power.

A further object is to provide a detent device in connection with the apparatus for maintaining the brake shoes in contact with the wheels, which detent device may be manually set for the release of the brakes and is automatically re-set to its operative position by the movement of the parts of the apparatus when release of the brakes takes place. The advantage of providing a brake setting apparatus with a device of this sort is that the apparatus is put in readiness to hold the brakes when set without any act or thought on the part of the trainman. Where, as is the case with the preferred embodiment of my invention, the setting operation is accomplished through manipulation of a lever, the brakeman can operate the setting mechanism with one hand while holding onto the car with the other hand. Time is also saved, which is an important consideration.

The invention consists in the novel and improved constructions, arrangements and devices, to be hereinafter described and claimed, for carrying out the aforesaid objects and such other incidental objects as will appear from the following description of the preferred embodiment of the invention disclosed in the accompanying drawings.

In the drawings—

Fig. 1 is a broken side elevation of a railway car of the gondola type provided with the brake operating mechanism of this invention, the mechanism being shown in full lines in the released position of the brakes, and in dotted lines in the set position.

Fig. 2 is a plan view of the apparatus.

Fig. 3 is an irregular horizontal, sectional view on line III—III of Fig. 1.

Fig. 4 is a fragmentary side view of a part of the apparatus taken from the inside.

Fig. 5 is an irregular section on line V—V of Fig. 1.

Fig. 6 is an irregular section on line VI—VI of Fig. 3, and

Fig. 7 is a fragmentary side elevation to illustrate the construction and operation of the device for holding the brakes in the set position.

Referring to the drawings, A designates the side of a railway car. 1 designates a toothed sector provided with lugs 2, and 3 are bolts passing through the lugs for securing the sector to the car. The sector is provided with a bracket 5 for supporting a pivot pin 6, located at the center of the curvature of the sector, on which is mounted a lever 8 comprising a lower section 9 and a handle member 10, the latter slidably connected with the former by means of a loop 12, the outward sliding movement of the handle member being limited by contact of a lug 14 on the handle member with loop 12.

The lever member 9 is provided with a detent 16 adapted to engage the toothed portion 17 of sector 1. This detent is mounted on a pivot 18 secured to the lever. 20 is a retaining member fastened to pin 18 and overlapping the sector. 24 is a tripping device for the detent mounted on a pivot extending between the lever 9 and the retaining member 20. The tripping member has a forward weighted end 27 and an upturned tail piece 28. When the trip is turned to bring the weighted end against the detent it serves to hold the detent in operative position against the sector. When tilted in the opposite direction with its tail piece 28 bearing against the detent it holds the latter out of engagement with the sector.

30 is a rack member arranged below the operating lever 8. In the embodiment of the invention shown in the drawings, this rack is formed integral with the sector structure and has an inclination downwardly in the direction away from the brakes and is provided with oppositely disposed, spaced flanges 32 having grooves formed on the inner surfaces thereof which have the same inclination as the rack. These grooves receive trunnions 35 formed on a rocking transmission element 36 which is shown as having the form of a bell crank. The transmission element or bell crank is provided at the junction of its two arms with an arcuate spur gear 38 for engagement with the rack 30. The forward arm 40 of the bell crank is connected to the lever member 9 by means of a link or other suitable tension or pull member. The other arm of the bell crank is connected by means of a chain, or other tension member, to the brake operating rigging on the under side of the car. The connection 43 operates generally in the horizontal direction, in the setting and releasing of the brakes. The link 41 has a movement which is substantially in a vertical direction. The rocking transmission device 36 transmits the upward pull on link 41 to a substantially horizontal pull on the brake connection 45. In rocking, however, the transmission element is forced to roll through the engagement of spur gear 38 with rack 30. The translatory movement of the transmission element, that is, the bodily movement of this element along the rack, serves to increase the amplitude of possible movement of the parts of the brake setting mechanism over the movement which could be imparted to said parts if the transmitting element merely pivoted instead of rolling on its fulcrum; this increase of movement being enhanced by the downward inclination of the rack. That is, besides pivoting the transmission element or bell crank is forced to move bodily away from both the brakes and the point at which power is applied to the brake connections by the hand lever. As a result, the bell crank may be made relatively small so that the device and the connections thereto do not lie too far from the body of the car or interfere with the other structures and mechanisms associated with the car.

*Summary of operation.*—To set the brakes the trainman moves the handle member 10 outwardly on the lever member 9 and then swings the lever downwardly, that is, from the position shown in full lines in Fig. 1 to or in the direction of the position shown in the dotted lines in that figure. This operation first takes up the slack in the brake connections and the movement, for the reasons stated, may be very rapid, considering the size of the bell crank 36, because of the rolling movement of the bell crank along rack 30. When the brake shoes are set against the wheels of the car the lever is released and the detent 16 engages one of the notches of the sector 1 to hold the brakes in the set position. The weighted end 27 of the tripping device 24 in such case bears against the detent to hold the same in operative engagement with the sector. To release the brakes the trainman reverses the position of the tripping device so that the tail piece of the same bears against the other end of the detent. By a slight downward movement of the lever the detent will be disengaged from the sector, by the weight of the tripping device, to allow the return of the parts of the brake setting mechanism to their normal or inoperative position. At the end of the upward or return swing of the lever the tripping device will be automatically returned to its normal or operative position through inertia or by gravity the lever when released passing a trifle beyond a vertical position (see dotted line position of the parts in Fig. 7) so that when the brakes are again set the detent will be ready to hold the apparatus in the brake set position of its parts. In all hand operated brake setting mechanism used in conjunction with compressed air actuated brake riggings there must be a considerable amount of slack in the connections between the brake shoes and the power applying device of the manually operated apparatus. The amount of slack will vary for different installations between certain limits and through wear on the track shoes, and other parts of the apparatus will not remain uniform for any car. The hand operated mechanism of my invention provides for a rapid take-up of this slack together with the application of great power to the brakes when they have been moved into contact with the brake shoes; and the operation of the apparatus is unaffected by considerable variation in the amount of slack to be taken up. The device works uniformly, or substantially so, at whatever point in the swing of the lever the brake shoes come into contact with the wheels. The trainman can set the brakes with one hand while holding onto the car with the other hand. The re-setting of the holding device takes place automatically on the release of the brakes so that this matter requires no attention. The power applied to the brake shoes will be much greater than that capable of development in the type of apparatus employing a brake staff with a hand wheel thereon. The apparatus is much more positive and certain in its operation than the old type of hand braking mechanism since the feature of winding of the chain on the brake staff that introduces an element of uncertainty into the operation of the old type of mechanism, is eliminated.

While I have shown the invention as applied to a gondola car, I do not restrict it to this use as it is obvious that slight modifications will render the apparatus adaptable to any types of freight or passenger cars without departing from the invention as set forth in the appended claims.

Having thus described my invention, what I claim and desire to secure by Letters Patent, is:

1. In a car brake, a member connected to the brake shoe mechanism of a car and capable of a compound movement, manually controlled means to actuate said member, a fixed pivot independent of the member and carrying said manually-controlled means, and means for imparting a compound movement to the member when the same is actuated by the manually controlled means.

2. In a car brake, a member connected to the brake shoe mechanism of a car and capable of a compound movement, manually controlled means to actuate said member, a fixed support for said manually controlled means independent of the member, and means for imparting a rotary and a rectilinear movement to the member when the same is actuated by the manually controlled means.

3. In a car brake, a bell-crank operably connected to the brake shoe mechanism of a car, a hand lever to actuate said bell-crank, a fixed mounting upon which said hand lever swings in an arc, and means coacting with the bell-crank to impart a compound movement thereto when actuated by the hand lever and cause the bell crank to describe a less arc than said hand lever.

4. In a car brake mechanism, a toothed sector, a hand lever operably connected to said sector, means coacting with the sector and carried by said hand lever to secure the same at different points of its movement, a bell-crank actuated by the hand lever, and means on the sector and said bell-crank to impart a compound movement thereto when actuated by the hand lever.

5. In a car brake mechanism, a toothed sector, a hand lever operably connected to said sector, means coacting with the sector and carried by said hand lever to secure the same at any point of its movement, a bell-crank actuated by the hand lever, a spur gear on the bell-crank, and a rack on the sector coacting with said spur gear to impart a compound movement to the bell-crank when the same is actuated by the hand lever.

6. In a car brake, a member connected to the brake shoe mechanism of a car, a manually controlled lever mounted on a fixed support independently of said member, an element operably connecting the member and said lever, and means engaging the member and coacting with said element in imparting a triple movement to the member when the lever is actuated.

7. In a car brake, a member connected to the brake shoe mechanism of a car, manual means mounted above on a fixed support and independently of said member, and means for imparting rotary, rectilinear, and downward movements to said member when the manual means is actuated.

8. In brake mechanism, a hand lever having a fixed pivot for setting the brakes, a bell crank connected with the brakes and having a fulcrum which moves in a path away from the brakes and said pivot when the brakes are being set, and means for connecting said lever and bell crank.

9. Brake setting mechanism comprising a lever, a bell crank connected with the brakes and having a fulcrum which travels in a path away from said lever and brakes when the brakes are being set, and a link connected to said bell crank and lever.

10. In a car brake, a bell-crank operably connected to the brake shoe mechanism of a car, a hand lever to actuate said bell-crank, a pivot for said hand lever independent of the bell crank, a spur gear on the bell-crank and a rack coacting with said spur gear to impart a compound movement to the bell-crank when the same is actuated by the hand lever and cause said bell crank to move away from the pivot.

11. In a car brake, a bell-crank operably connected to the brake shoe mechanism of a car, a hand lever to actuate said bell-crank, spur gearing to impart a compound movement to the bell-crank when the same is actuated by the hand lever, grooved guide members disposed at opposite sides of the bell-crank, and trunnions on the bell-crank operably mounted in said grooved guide members.

12. In a car brake, a bell-crank operably connected to the brake shoe mechanism of a car, a bell-crank hand lever having an extensible handle member, a link operably connecting the bell-crank to said bell-crank hand lever, and means coacting with the bell-crank to impart a compound movement thereto when actuated by the hand lever.

13. In a car brake, a member connected to the brake shoe mechanism of a car and capable of a compound movement, manually controlled means to actuate said member, a fulcrum for said manually controlled means independent of the member, spur gearing to impart a compound movement to the member when the same is actuated by the manually controlled means, grooved guide members disposed at opposite sides of the member, and trunnions on said member operably mounted in said grooved guide members.

14. In a car brake, means for setting the brakes and mechanism for transmitting power from the brake setting means to the brake comprising a bell-crank having a moving fulcrum which travels away from the brakes and the brake setting means when the brakes are being set.

15. In a car brake, means for setting the brakes and mechanism for transmitting power from the brake setting means to the brake comprising a bell-crank one arm of which is connected to the brakes and the other arm to the brake setting means and having a fulcrum which travels, when the brakes are being set, away from the brakes and said brake setting means.

16. In a car brake, means for setting the brakes and mechanism for transmitting power from the brake setting means to the brake comprising a floating lever, one end of which is connected to the brakes and the other to said brake setting means, the fulcrum of which moves, when the brakes are being set, in a path away from the brakes and said brake setting means.

17. In combination with the brakes of a railway car, power applying means, a rocking transmission element, and connections between the transmission element and the brakes and power applying means, respectively, comprising a tension member engaging said transmission element with the power applying means, the transmission element being mounted on the car so that while being rocked it is moved bodily to increase the take-up of said connections.

18. In combination with the brakes of a railway car, power applying means, a rocking transmission element, and connections between the transmission element and the brakes and power applying means, respectively, comprising a link engaging said transmission element with the power applying means said transmission element being mounted on the car so that while being rocked it is moved bodily to increase the take-up of said connections.

19. In combination with the brakes of a railway car, power applying means, a rocking transmission element, and a connection extending upwardly from the transmission element to the power applying means, said transmission element being mounted on the car so that when rocked it is moved bodily to increase the take-up of said connection.

20. In combination with the brakes of a railway car, power applying means, a rocking transmission element, a connection between the transmission element and the brakes and a tension member pivoted to the transmission element and to the power applying means, the fulcrum of said transmission element being adapted to be moved in a straight line when said element is rocked to increase the take-up of said connections.

21. In combination with the brakes of a railway car, power applying means, a rocking transmission element, and connections between the transmission element and the brakes and power applying means, respectively, the fulcrum of said transmission element being adapted to be moved, when said element is rocked, in a direction away from the power applying means to increase the take-up of said connections.

22. In combination with the brakes of a railway car, power applying means, a rocking transmission element and connections between the transmission element and the brakes and power applying means, respectively, the fulcrum of said transmission element being adapted to be moved, when said element is rocked, in a direction away from the power applying means and from the brakes to increase the take-up of said connections.

23. In combination with the brakes of a railway car, power applying means and a rocking and rolling transmission element, a connection between the transmission element and the brakes, and a tension member pivoted to and providing a connection between the transmission element and the power applying means.

24. In combination with the brakes of a railway car, power applying means and a rocking and rolling transmission element formed with a curved toothed portion at its fulcrum, a straight rack on the car with which said toothed portion engages, a connection between said transmission element and the brakes and a tension member pivoted to the transmission element and power applying means for exerting a pull on the transmission element to cause the same to roll.

25. In combination with the brakes of a railway car, power applying means, a transmission element, a connection between the power applying means and brakes, a tension member pivoted to the transmission element and to the power applying means, and a device on the car with which the transmission element has a pivot and slot engagement permitting said element to have rolling movements, said element and device being provided with coacting means whereby the transmission element is compelled to roll when it is rocked.

26. In combination with the brakes of a railway car, power applying means, a transmission element, a connection between the power applying means and brakes, a tension member pivoted to the transmission element and to the power applying means, and a device on the car with which the transmission element has a pivot and slot engagement permitting said element to have rolling movements, said transmission element being provided with a spur gear at its fulcrum and said device on the car with a rack engaged by said spur gear.

27. In apparatus for operating the brakes of a railway car, the combination with members movable substantially in the direction of their length, of a rocking transmission element connecting said members and supported so that when said element is rocked its fulcrum is moved to increase the amplitude of possible movement imparted to the brakes.

28. In apparatus for operating the brakes of a railway car, the combination with members movable substantially in the direction of their length which work at angles to each other, of a rocking transmission element connecting said members and supported so that when said element is rocked its fulcrum is moved to increase the amplitude of possible movement imparted to the brakes.

29. The combination with a railway car and its brakes, of mechanism for operating the brakes comprising a rocking transmission element, a substantially horizontal connection between the transmission element and the brakes, a hand operated power applying device arranged on the car above the transmission element, a rigid link connected with the power applying device, for exerting a pull on the transmission element, and means on the car engaged by said transmission element whereby the latter, when rocked, is also moved bodily to increase the take-up on the brakes.

30. The combination with a railway car and its brakes, of mechanism for operating the brakes comprising a rocking transmission element having a spur gear at its fulcrum, a substantially horizontal connection between the transmission element and the brakes, a hand operated power applying device arranged on the car above the transmission element, a link connecting the transmission element with the power applying device, and a rack on the car with which said spur gear is engaged.

31. The combination with a railway car and its brakes, of mechanism for operating the brakes comprising a rocking transmission element having a spur gear at its fulcrum, a substantially horizontal connection between the transmission element and the brakes, a hand operated power applying device arranged on the car above the transmission element, a link connecting the transmission element with the power applying device and a downwardly inclined rack on the car with which said spur gear is engaged.

32. The combination with a railway car and its brakes, of mechanism for operating the brakes comprising a rocking transmission element provided with trunnions, and a spur gear adjacent the same, a substantially horizontal connection between the transmission element and the brakes, a hand operated power applying device arranged on the car above the transmission element, a link connecting the transmission element with the power applying device, and a channel-shaped device arranged in inverted position on the car, the sides of which are formed with elongated recesses to receive said trunnions and the bottom of which is formed with a rack meshed by said spur gear.

33. The combination with a railway car and its brakes, of mechanism for operating the brakes comprising a rocking transmission element provided with trunnions and a spur gear adjacent the same, a substantially horizontal connection between the transmission element and the brakes, a hand operated power applying device arranged on the car above the transmission element, a link connecting the transmission element with the power applying device, and a channel-shaped device arranged in inverted position on the car, the sides of which are formed with elongated recesses to receive said trunnions and the bottom of which is formed with a rack meshed by said spur gear, said rack and recesses having a downward inclination, for the purpose described.

34. In apparatus for manipulating the brakes of a railway car, a device for holding the brakes set comprising a rack and detent and means for setting the detent to clear the rack when the brakes are released which automatically resets the detent to engage the rack when the brakes are completely released.

35. In apparatus for manipulating the brakes of a railway car, a power applying device and means for holding the parts of the same in brake setting position comprising a rack, a detent and a tripping device adapted to be set to hold the detent out of engagement with the rack when the brakes are released, said detent being movably mounted so as to automatically re-set the detent in position to engage the rack on release of the brakes.

36. An apparatus for setting and releasing the brakes of a railway car in combination with means for holding the parts of said apparatus in their braking position, which means may be set to allow the release of the brakes, and means whereby the releasing operation of said apparatus re-sets the holding means.

37. In apparatus for manipulating the brakes of a railway car, the combination with the brake shoe operating rigging and a power applying device, of the rocking and rolling transmission element provided with laterally projecting trunnions, an arcuate pinion adjacent the trunnions, a supporting member on said transmission element consisting of an inverted channel shaped member having an interior downwardly and outwardly extending rack formed on the under side thereof and internal recesses in the side members to receive said trunnions and an upwardly movable tension member pivoted to the transmission element and power applying device for moving said transmission element downwardly on said rack.

38. In combination with the brakes of a railway car, apparatus for manipulating the same comprising a power applying device, a rocking transmission element, having a segmental toothed fulcrum, connections between the transmission element and the power applying device and brakes respectively, and a member fixed to the car having a rack diagonally disposed with respect to said connections.

39. The combination with a railway car and its brakes, of a brake operating connection under the car, a member on the car movable upwardly, a transmission element operatively connected with the upwardly movable member and with the brake connection having angular motion and simultaneously therewith also translatory motion that increases the extent of movement of the brake operating connection with respect to that of the upwardly movable member, and means for imparting movement to the upwardly movable member.

40. In apparatus for operating the brakes of a railway car, the combination of members movable substantially in the direction of their length, of a rocking transmission element connecting said members and supported so that when said element is rocked its fulcrum is moved to increase the amplitude of possible movement imparted to the brakes, and a lever for rocking said element which, in the operation of setting the brakes, turns on a stationary axis.

In testimony whereof I affix my signature in the presence of two witnesses.

AUGUSTUS F. KLASING.

Witnesses:
F. G. FISCHER,
L. J. FISCHER.